US007022154B2

(12) United States Patent
Oh

(10) Patent No.: US 7,022,154 B2
(45) Date of Patent: Apr. 4, 2006

(54) CYCLONE-TYPE DUST COLLECTING APPARATUS FOR A VACUUM CLEANER

(75) Inventor: Jang-keun Oh, Gwangju (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 550 days.

(21) Appl. No.: 10/406,432

(22) Filed: Apr. 3, 2003

(65) Prior Publication Data

US 2004/0103495 A1 Jun. 3, 2004

(30) Foreign Application Priority Data

Nov. 29, 2002 (KR) ..................... 10-2002-0075175

(51) Int. Cl.
*B01D 45/12* (2006.01)

(52) U.S. Cl. ......................... 55/426; 55/429; 55/459.1; 55/DIG. 3

(58) Field of Classification Search .................. 55/429, 55/459.1, 426, DIG. 3; 15/352, 353
See application file for complete search history.

(56) References Cited

U.S. PATENT DOCUMENTS

| | | | | |
|---|---|---|---|---|
| 4,172,710 | A | 10/1979 | Van Der Molen | |
| 6,398,834 | B1 | 6/2002 | Oh | |
| 6,432,154 | B1 | 8/2002 | Oh et al. | |
| 6,532,620 | B1 | 3/2003 | Oh | |
| 6,810,557 | B1 * | 11/2004 | Hansen et al. | 15/353 |
| 2001/0042283 | A1 | 11/2001 | Oh et al. | |
| 2002/0011053 | A1 | 1/2002 | Oh | |
| 2003/0106182 | A1 | 6/2003 | Lee | |

FOREIGN PATENT DOCUMENTS

| | | |
|---|---|---|
| DE | 19938769 | 3/2001 |
| DE | 19938774 | 3/2001 |
| GB | 2364939 | 2/2002 |
| GB | 2364940 | 2/2002 |
| GB | 2384452 | 7/2003 |
| NL | 1017181 | 4/2002 |
| NL | 1017219 | 4/2002 |
| NL | 1020578 | 10/2003 |

* cited by examiner

*Primary Examiner*—Robert A. Hopkins
(74) *Attorney, Agent, or Firm*—Ladas & Parry LLP

(57) ABSTRACT

A cyclone-type dust collecting apparatus for a vacuum cleaner having a dual contaminant separating structure in which contaminants can be effectively separated and collected comprising a cyclone body having a dual structure including a first outer cylinder and a first inner cylinder with the lower part open, and an air inlet portion and an air discharge portion connected to an upper surface of the body portion in an area of an upper surface of the inner cylinder for air, including entrained contaminants, to flow in through the air inlet portion to form a cyclone stream, a first contaminant discharge path formed on the lower side of the first inner cylinder for discharging contaminants to a space between the first inner cylinder and the first outer cylinder, a contaminant collecting receptacle having an inner space divided into a first contaminant collecting space and a second contaminant collecting space by the dual structure of a second outer cylinder corresponding to the first outer cylinder and a second inner cylinder corresponding to the first inner cylinder, the contaminant collecting receptacle having at least one second contaminant discharge path formed on the lower side of the second inner cylinder, and a grill mounted at the beginning of the air discharge portion inside the cyclone body for preventing the contaminants separated from air from reversing through the air discharge portion.

10 Claims, 5 Drawing Sheets

CYCLONE-TYPE DUST COLLECTING APPARATUS FOR A VACUUM CLEANER

BACKGROUND OF THE INVENTION

1. Field of the Invention

The present invention relates generally to a cyclone-type dust collecting apparatus for a vacuum cleaner separating and collecting dust and all kinds of foreign substances (hereinafter called "contaminants") from a cyclone stream by a centrifugal force of the circulating cyclone stream in the air including contaminants drawn in through a suction brush, and more particularly, to a cyclone-type dust collecting apparatus for a vacuum cleaner having a two-step contaminant separating structure.

2. Description of the Prior Art

A conventional cyclone-type dust collecting apparatus 100 for a vacuum cleaner is shown in FIGS. 1 and 2. As shown in FIGS. 1 and 2, the conventional cyclone-type dust collecting apparatus of a vacuum cleaner comprises a cyclone body 10 a contaminant collecting receptacle 20 and a grill 30.

The cyclone body 10 comprises an air inlet pipe 11 and an air discharge pipe 12. The air inlet pipe 11 is connected to a side of the cyclone body 10 and the air discharge pipe 12 is connected to the cyclone body 10 on the center of the upper surface. When the cyclone-type dust collecting apparatus 100 is disposed within the vacuum cleaner body 200, the air inlet pipe 11 is connected with an air inlet path 210 (shown in phantom) formed in the vacuum cleaner body 200 to provide a connection through a suction brush 300 and the air discharge pipe 12 is connected with an air discharge path 220 (shown in phantom) formed to provide a connection to a motor driving chamber 310 of the vacuum cleaner body 200.

The air, including entrained contaminants drawn in through the suction brush 300 flows into the cyclone body 10 in a direction tangential to the cyclone body 10 passing the air inlet path 210 of the vacuum cleaner body 200 and the air inlet pipe 11. Accordingly, a cyclone stream is formed in the cyclone body 10 and the entrained contaminants included in the cyclone stream are separated by the centrifugal force of the circulating cyclone stream. The cleaned air is discharged to the outside environment through the air discharge pipe 12, the air discharge path 220 of the vacuum cleaner body 200, and the motor driving chamber 310.

The contaminant collecting receptacle 20 is removably connected to the lower part of the cyclone body 10 and collects the contaminants separated from the air by the centrifugal force of the cyclone stream created in the cyclone body 10.

The grill 30 is disposed at the beginning of the air discharge pipe 12 inside the cyclone body 10 and prevents the contaminants separated from the cyclone stream from reversibly flowing through the air discharge pipe 12. The grill 30 preferably comprises a grill body 31 and a plurality of paths 32 formed on the outer circumferential surface of the grill body 31 to provide a fluid communication through the air discharge pipe 12. In addition, the grill 30 comprises a contaminant blocking member 33 disposed below the grill body 31.

The general cyclone-type dust collecting apparatus having the structure as described above has the air inlet pipe 11 and the air discharge pipe 12 of the cyclone body 10 disposed at the vacuum cleaner body 200 respectively to be connected with the air inlet path 210 and the air discharge path 220.

When the vacuum cleaner is in operation, suction force is generated in the suction brush 300 as the motor of the motor driving chamber 310 is driven. The air, including entrained, contaminants removed from the surface to be cleaned by the suction force, flow into the cyclone body 10 through the suction brush 300, the air inlet path 210, and the air inlet pipe 11. The air stream is induced by the air inlet pipe 11 to move in an oblique or tangential direction along the inner circumference of the cyclone body 10 so as to form a cyclone stream and accordingly the contaminants entrained in the air are separated by the weight created by the centrifugal force of the air stream and are then collected in the contaminant collecting receptacle 20. The cleaned air is then discharged outside through the paths 32 and the air discharge pipe 12 of the grill 30, the air discharge path 220, and the motor driving chamber 310. During the contaminant separating process, the contaminants raised with air by the cyclone stream rising back up after hitting the bottom of the contaminant collecting receptacle 20 are blocked by the contaminant blocking member 33 and reenter the cyclone stream.

In the cyclone-type dust collecting apparatus of a vacuum cleaner as described above, collecting the contaminants from the cyclone stream and preventing the contaminants from reversibly flowing are significant factors affecting the dust collecting efficiency of a vacuum cleaner. Although there have been continuous attempts and research toward the goal of efficiently collecting contaminants and preventing a reverse flow action, these attempts and research have reached a structural limit.

Since the general cyclone-type dust collecting apparatus of a vacuum cleaner has a contaminant collecting portion of the contaminant collecting receptacle 20 that is completely open to the cyclone stream, it is impossible to prevent contaminants from being raised with the air by the cyclone stream rising back up after hitting the bottom of the contaminant collecting receptacle 20. Therefore, a portion of the raised contaminants can easily approach near the paths 32 and it is nearly impossible to prevent the raised contaminants from being discharged outside through the paths 32 with the conventional types of vacuum cleaners.

The general cyclone-type dust collecting apparatus of a vacuum cleaner shown in FIGS. 1 and 2 having a single contaminant separating structure and grill 30 can hardly expect improvement in the prevention of such ineffective dust collecting process and a contaminant reverse flow action, and therefore what is required is a structural development in which contaminants are effectively collected and are prevented from easily approaching near the paths 32 of the grill 30.

SUMMARY OF THE INVENTION

An object of the invention is to solve at least the above problems and/or disadvantages and to provide at least the advantages described hereinafter.

Accordingly, one object of the present invention is to solve the foregoing problems by providing a cyclone-type dust collecting apparatus of a vacuum cleaner having an improved structure for effective contaminant separation and collection by having a dual contaminant separating structure and for isolating the contaminant collecting portion from the cyclone stream.

Another object of the present invention is to provide a cyclone-type dust collecting apparatus of a vacuum cleaner improved in structure for preventing a contaminant reverse flow action by restraining contaminants from approaching near the air discharge paths of a grill.

The foregoing and other objects and advantages are realized by providing a cyclone-type dust collecting apparatus for a vacuum cleaner comprising a cyclone body having a body portion with a dual structure of a first outer cylinder and a first inner cylinder being open at a lower side thereof, and an air inlet portion and an air discharge portion connected to an upper surface of the body portion in an area of an upper surface of the inner cylinder for air, including contaminants entrained therein, flowing through the air inlet portion to form a cyclone stream, the cyclone body having at least one first contaminant discharge path formed on the lower side of the first inner cylinder for discharging contaminants separated by the centrifugal force of the cyclone stream to a space between the first inner cylinder and the first outer cylinder, a contaminant collecting receptacle removably mounted to the cyclone body for collecting the contaminants separated from the air by the cyclone stream generated inside the cyclone body, the contaminant collecting receptacle further having an inner space divided into a first contaminant collecting space and a second contaminant collecting space by a dual structure, including a second outer cylinder corresponding to the first outer cylinder and a second inner cylinder corresponding to the first inner cylinder, the contaminant collecting receptacle having at least one second contaminant discharge path formed on the lower side of the second inner cylinder for discharging contaminants from the first contaminant space to the second contaminant space, and a grill mounted at the beginning of the air discharge portion inside the cyclone body for preventing the contaminants separated from the air from flowing in a reverse direction through the air discharge portion.

According to the preferred embodiment of the present invention, the cyclone-type dust collecting apparatus for a vacuum cleaner further comprises a pair of first contaminant discharge paths and a pair of second contaminant discharge paths, with each member of the pair formed to face the other member of the pair.

The grill comprises a grill body and a plurality of paths formed on an outer circumferential surface of the grill body to provide fluid communication to the air discharge portion.

In addition, the grill may also comprise a contaminant blocking member disposed below the grill body for inhibiting contaminants from rising with the air in the contaminant collecting receptacle and becoming rejoined with the cyclone stream.

The plurality of paths are formed by a plurality of path members disposed on the outer circumferential surface of the grill body at predetermined intervals to slant at a predetermined angle.

The contaminant blocking member comprises a frusto-conical portion extended downwardly at a predetermined angle from the lower circumferential end of the grill body, and a cylindrical portion extended downwardly for a predetermined length from the frusto-conical portion.

The contaminant blocking member may be integrally formed with the grill body or comprise a separate structure from the grill body, which is then assembled with the grill body by a connection means.

The connection means comprises a fastening protrusion and a fastening groove formed on connection portions of the contaminant blocking member and the grill body to correspond with the other. The fastening protrusion and the fastening groove have both long and short axes and are fastened by inserting the fastening protrusion into the fastening groove with the long axes coinciding and then turning the fastening protrusion so that the long axis of the fastening protrusion engages the short axis of the fastening groove.

BRIEF DESCRIPTION OF THE DRAWINGS

The above object and the feature of the present invention will be more apparent by describing a preferred embodiment of the present invention with reference to the accompanying drawings, in which.

DETAILED DESCRIPTION OF THE PREFERRED EMBODIMENT

Hereinafter, a cyclone-type dust collecting apparatus according to a preferred embodiment of the present invention will be described in greater detail with reference to the accompanying drawings.

Figure 1:
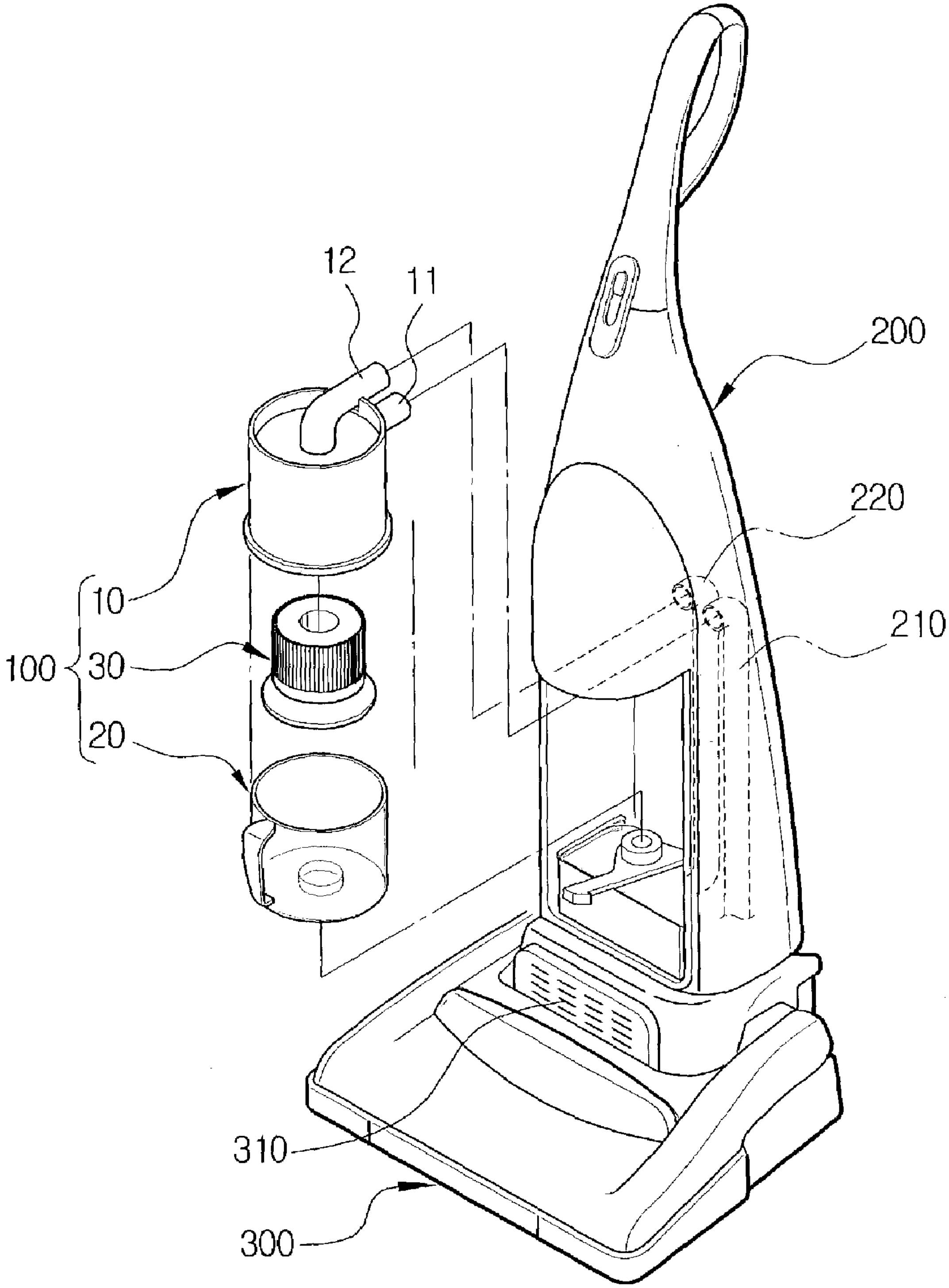
FIG. 1 (PRIOR ART)
FIG. 1 is a partially exploded, perspective view showing a cyclone-type dust collecting apparatus of a general vacuum cleaner and the disposition of the cyclone-type dust collecting apparatus within the vacuum cleaner.
Figure 2:
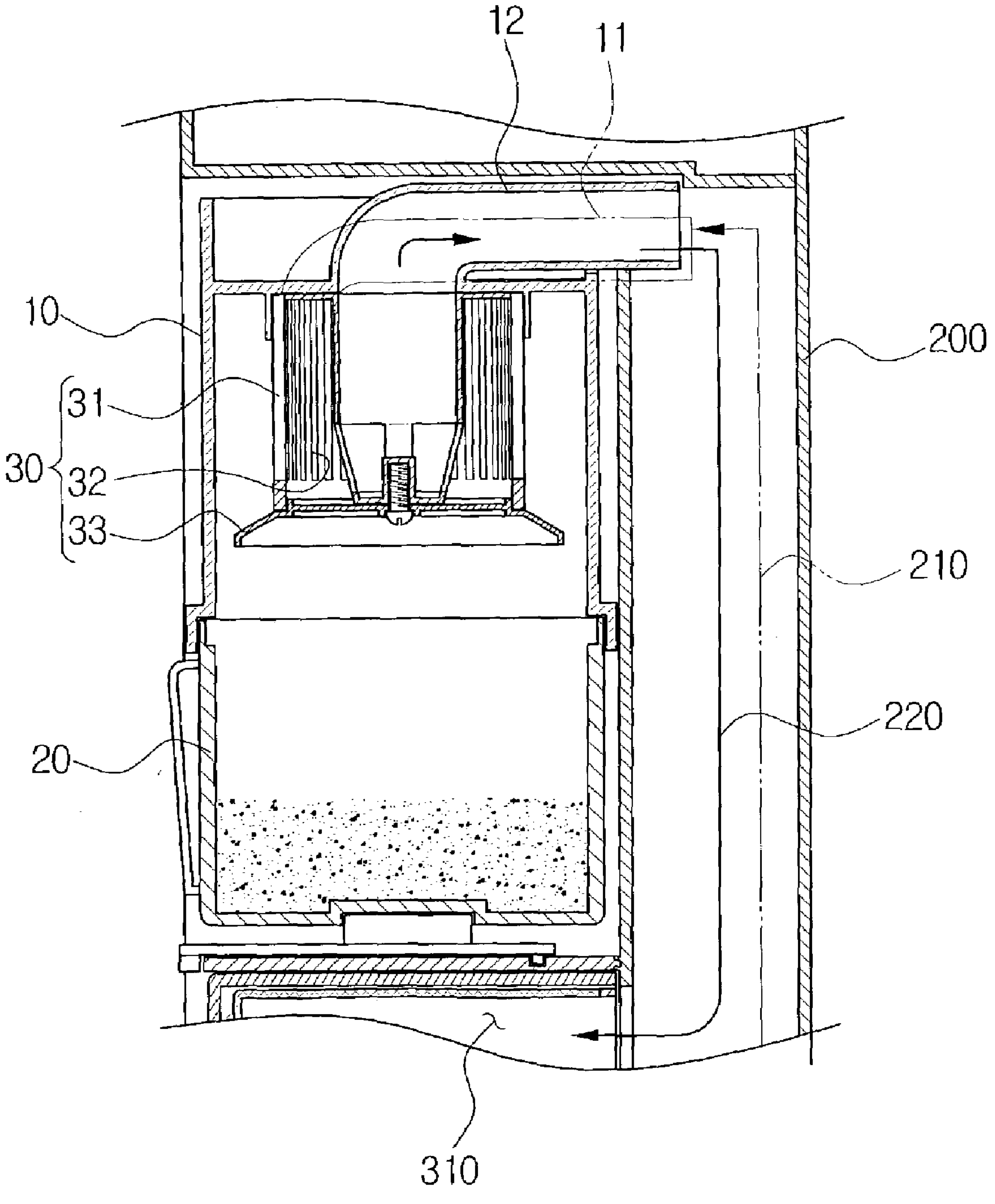
FIG.2 (PRIOR ART)
FIG. 2 is a cross-sectional view of the cyclone-type dust collecting apparatus shown in FIG. 1 following assembly.
Figure 3:
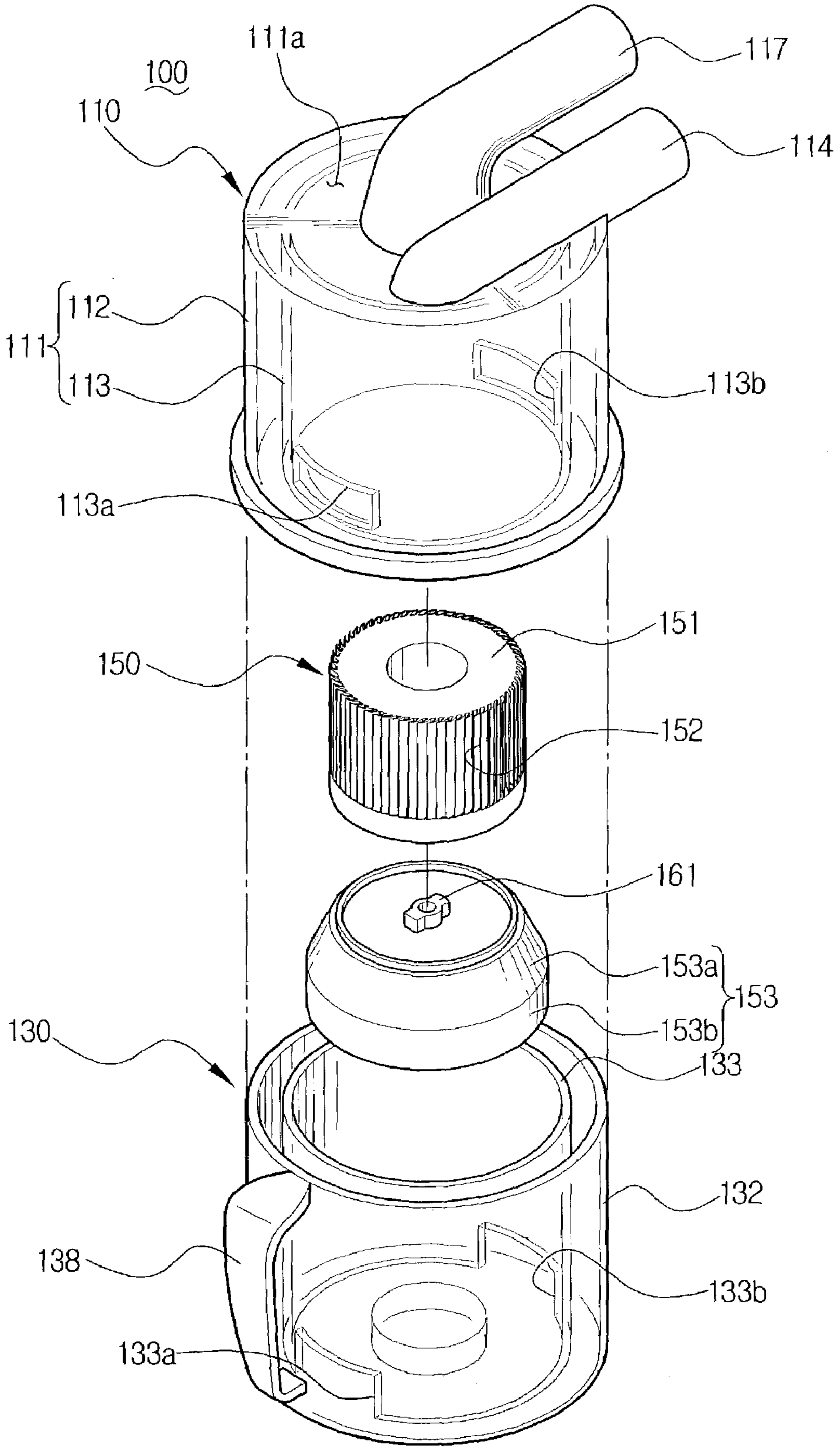
FIG. 3 is an exploded perspective view showing a cyclone-type dust collecting apparatus for a vacuum cleaner according to an embodiment of the present invention.
Figure 4:
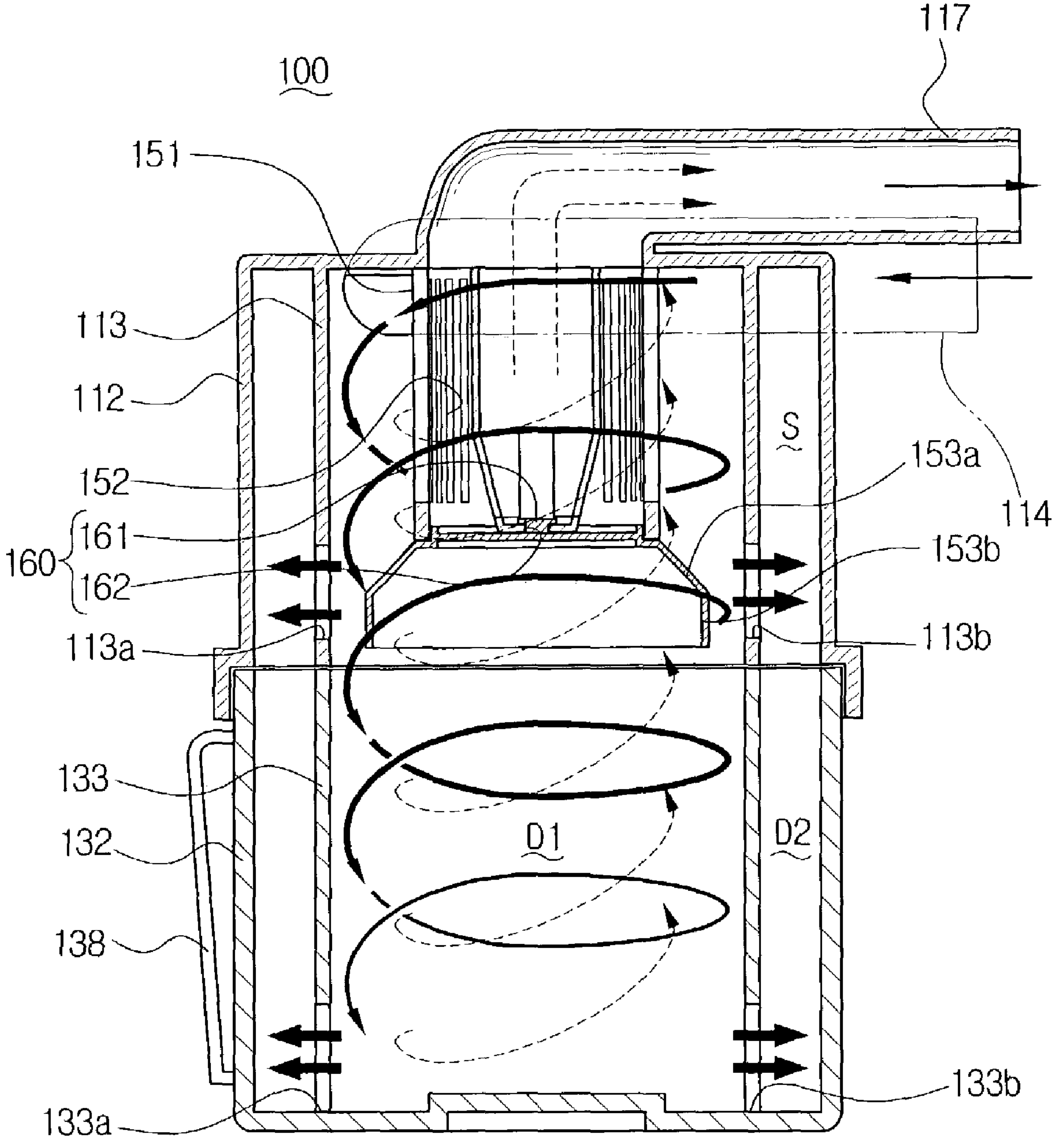
FIG. 4 is a cross-sectional view showing a cyclone-type dust collecting apparatus of a vacuum cleaner according to the embodiment shown in FIG. 3 following assembly and in operation.

As shown in FIGS. 3 and 4 a cyclone-type dust collecting apparatus 100 of a vacuum cleaner according to an embodiment of the present invention comprises a cyclone body 110, a contaminant collecting receptacle 130, and a grill 150.

Figure 5:
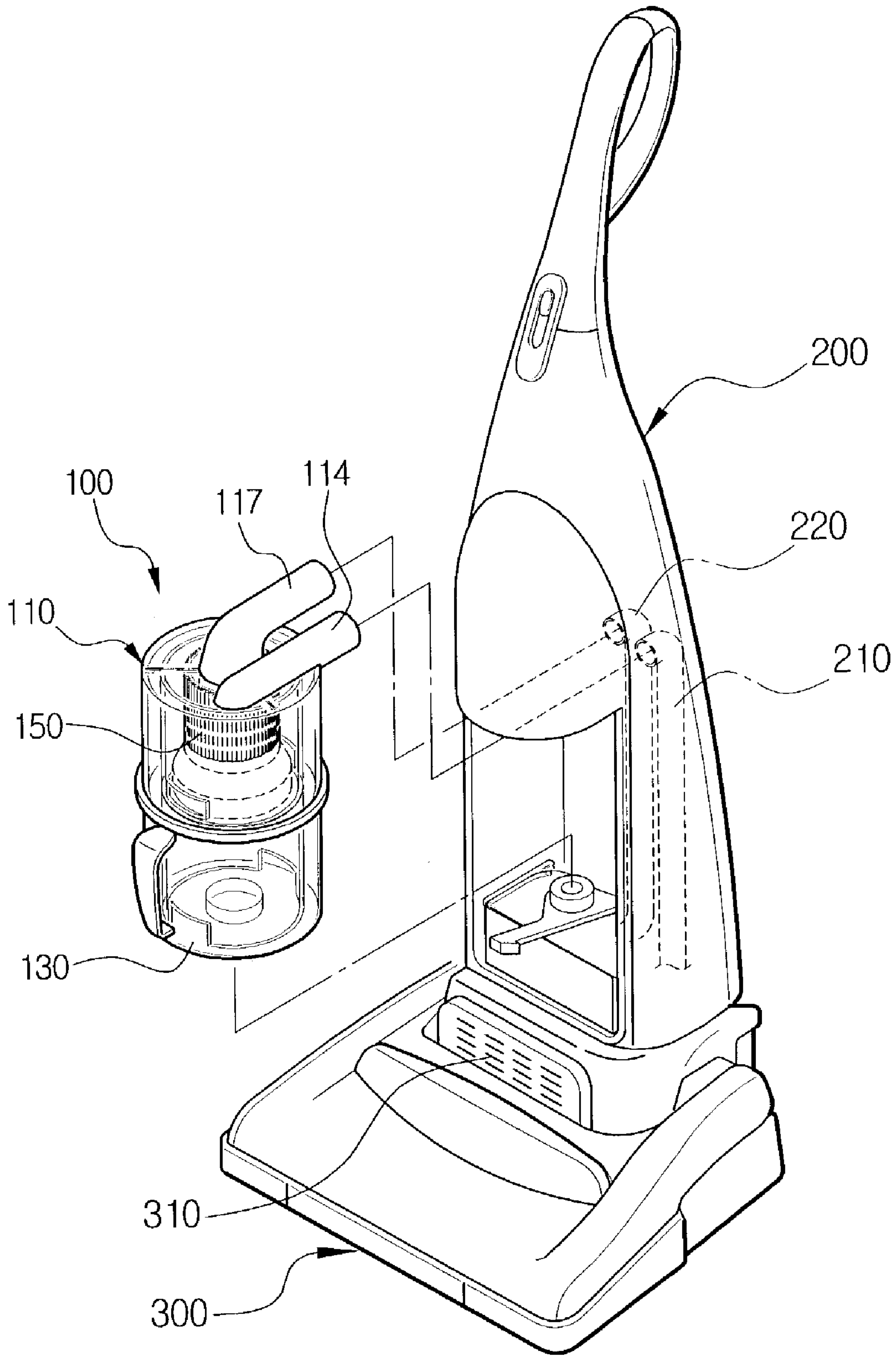
FIG. 5 is a perspective view showing the disposition of a cyclone-type dust collecting apparatus to a vacuum cleaner according to an embodiment of the present invention ready for mounting in a vacuum cleaner.

The cyclone body 110 comprises a body portion 111, an air inlet portion 114, and an air discharge portion 117. The body portion 111 has a dual cylinder structure comprising a first outer cylinder 112 and a first inner cylinder 113 both being open in the downward direction after assembly. The first inner cylinder 113 has a pair of first contaminant discharge paths **113*a*, 113*b* at the lower side thereof. An end of the air inlet portion 114 and the air discharge portion 117 are connected respectively to the upper surface 111*a* of the body portion 111 within the area of the upper surface of the inner cylinder 113. As shown in FIG. 5, the other ends of the air inlet portion 114 and the air discharge portion 117 are each connected respectively to an air inlet path 210 and an air discharge path 220 formed in a vacuum cleaner body 200 when the cyclone-type dust collecting apparatus is mounted in the vacuum cleaner body 200. The air inlet path 210 is connected to a suction brush 300, and the air discharge path 220 is connected with a motor driving chamber 310. The air inlet portion 114 is connected to the inner circumferential surface of the first inner cylinder 113 in a tangential direction, and the air discharge portion 117 is connected to the upper portion of the first inner cylinder 113** in the middle.

When the vacuum cleaner is in operation, the contaminant laden air drawn in through the suction brush 300 (FIG. 5) flows into the cyclone body 110 in a direction tangential to the body wall through the air inlet path 210 and the air inlet portion 114. Accordingly, a cyclone stream is formed in the cyclone body 110 and a portion of the contaminants included in the cyclone stream is separated from the air in the cyclone by the centrifugal force formed by the cyclone stream. The cleaned air is discharged outside through the air discharge portion 117, the air discharge path 220 of the vacuum cleaner body 200, the motor driving chamber 310 and out to the external environment. The portion of the contaminants separated from the cyclonic air is discharged into the space S (FIG. 4) between the first inner cylinder 113 and the first outer cylinder 112 through the first contaminant discharge paths 113*a*, 113*b*, and the discharged contaminants fall and are collected into a second contaminant collecting space D2, which will be described later, of the contaminant collecting receptacle 130.

Whilst the first contaminant discharge paths 113*a*, 113*b* are formed on the first inner cylinder facing each other, the number of the first contaminant discharge path is not limited to two but may be varied in any number, for example, one or three.

The contaminant collecting receptacle 130 is removably mounted under the cyclone body 110 for collecting contaminants separated from the cyclonic air by the centrifugal force formed by the cyclone stream in the cyclone body 110. The contaminant collecting receptacle 130 has a dual cylinder structure of a second outer cylinder 132 corresponding to the first outer cylinder 112 and a second inner cylinder 133 corresponding to the first inner cylinder 113, and the inner space of the contaminant collecting receptacle 130 is divided into a first contaminant collecting space D1 and the second contaminant collecting space D2 by the second inner cylinder 133. In addition, the second inner cylinder 133 has a pair of second contaminant discharge paths 133*a*, 133*b* formed at the lower side thereof to face each other, which are used for discharging contaminants from the first contaminant collecting space D1 to the second contaminant collecting space D2.

The cyclone stream formed inside the cyclone body 110 continuously descends towards the first contaminant collecting space D1 of the contaminant collecting receptacle 130. The contaminants included in the descending cyclone stream, which are not discharged through the first contaminant discharge paths 113*a*, 113*b*, are discharged and collected into the second contaminant collecting space D2 through the second contaminant discharge paths 133*a*, 133*b*. The air that flown in with the cyclone stream hits the bottom of the contaminant collecting receptacle 130, rises back up, and is discharged through the air discharge portion 117.

The contaminant collecting receptacle 130 may have any number of contaminant discharge paths formed on the second inner cylinder 133 other than two shown in the drawing of the embodiment. In addition, the contaminant collecting receptacle 130 may have a grip 138 for easy handling and when the contaminant collecting receptacle 130 is full, only the contaminant collecting receptacle 130 need be separated for emptying the contaminants that have been collected inside.

The grill 150 is disposed at the end of the air discharge port 117 inside the cyclone body 110 to prevent the contaminants separated from the air from reversibly flowing into the air discharge portion 117. The grill 150 comprises a grill body 151, and a plurality of paths 152 formed on the outer circumference of the grill body 151 to provide a connection to the air discharge portion 117.

The grill 150 may also comprise a grill body 151, a plurality of paths 152 formed on the outer circumference of the grill body 151 to provide a connection to the air discharge portion 117, and a contaminant blocking member 153 (FIG. 4) disposed below the grill body 151 for blocking contaminants rising with the air inside the contaminant collecting receptacle 130 and thereby inhibiting contaminants from reuniting with the cyclone stream. The latter example of the grill 150 comprising the contaminant blocking member 153 is more preferable as contaminant reverse flow action can be more effectively prevented than the former example.

Although it is preferable that the paths 152 are formed by a plurality of path members disposed on the outer circumferential surface of the grill body 151 at predetermined intervals to slant at a predetermined angle, the paths 152 may also be formed by boring a plurality of fine holes into the outer circumferential surface of the grill body 151 itself.

The contaminant blocking member 153 comprises a frusto-conical portion 153*a* extended downwardly at a predetermined angle extending from the lower circumferential end of the grill body 151, and a cylindrical portion 153*b* that extends downwardly at a predetermined length from the frusto-conical portion 153*a*. Compared to the simple disk or conical type conventional contaminant blocking member, the contaminant blocking member 153 according to the present invention, can more effectively prevent contaminants, particularly such as long thin hair, from approaching to the paths 152.

While the contaminant blocking member 153 may also be formed integrally with the grill body 151, it is more beneficial to form the contaminant blocking member 153 separately from the grill body 151 and assemble them using a connection means 160 in the aspect of formation and assembling.

The connection means 160 may have any form as long as it connects the contaminant blocking member 153 and the grill body 151. However, it is preferable that the connection means 160 comprises a fastening protrusion 161 and a fastening groove 162 formed on the contaminant blocking member 153 and the grill body 151 to correspond to the construction of the other, as shown in the drawing.

The fastening protrusion 161 and the fastening groove 162 have both long and short axes. After inserting the fastening protrusion 161 into the fastening groove 162 with the long axes being coincidental, the fastening protrusion 161 is turned so that the long axis of the fastening protrusion 161 is held by the short axis of the fastening groove 162. Accordingly, the contaminant blocking member 153 can be assembled to connect to the grill body 151.

The cyclone-type dust collecting apparatus of a vacuum cleaner according to the present invention having the above-described structure is mounted into the vacuum cleaner body 200 for the air inlet portion 114 and the air discharge portion 117 of the cyclone body 110 to be connected respectively to the air inlet path 210 and the air discharge path 220 of the vacuum cleaner body 200.

When the vacuum cleaner is in operation, the motor of the motor driving chamber 310 is driven and accordingly suction force is generated in the suction brush 300. Due to the suction force, the air including contaminants from the surface to be cleaned flows into the cyclone body 110 through the suction brush 300, the air inlet path 210 of the vacuum cleaner body 200, and the air inlet port 114 of the cyclone body 100. The air is induced to move in an oblique or tangential direction along the inner circumference of the first inner cylinder 113 of the cyclone body 110 to form a cyclone stream (as shown by unbroken arrows in FIG. 4) by the air inlet port 114 and accordingly the contaminants entrained in the air are separated by centrifugal force. The contaminants separated from the air are discharged to the space S through the first contaminant discharge paths 113*a*, 113*b* formed on the first inner cylinder 113 and are collected in the second contaminant collecting space D2 of the contaminant collecting receptacle 130, (as shown by thick arrows in FIG. 4).

Meanwhile, the cyclone stream continuously descends towards the first contaminant collecting space D1 of the contaminant collecting receptacle 130 and the contaminants entrained in the descending cyclone stream continues to be separated from the air by the centrifugal force of the cyclone stream. The contaminants separated in the first contaminant collecting space D1 are discharged through the second contaminant discharge path 133*a*, 133*b*, formed on the second inner cylinder 133 of the contaminant collecting receptacle 130 and are collected in the second contaminant collecting space D2, (as shown by thick arrows in FIG. 4).

The cyclone stream that has descended to the bottom of the contaminant collecting receptacle 130 hits obliquely against the bottom and rises back up, (as shown by broken arrows in FIG. 4) and a portion of the contaminants collected in the contaminant collecting receptacle 130 rises along with the ascending cyclone stream. However, according to the present invention, the raised contaminants are blocked by the contaminant blocking member 153 and return to again become entrained in the cyclone stream without rising further. Particularly, the contaminant blocking member 153 of the present invention more effectively blocks contaminants such as a long thin hair because of the construction comprising the frusto-conical portion 153*a* and the cylinder portion 153*b*, which thereby prevent the contaminants from approaching near the paths 152 of the grill 150. Therefore, the route for contaminants to flow back towards the paths 152 of the grill 150 can be minimized.

The air rising in the cyclone stream and reversing up after hitting the bottom is eventually discharged through the paths 152 of the grill, but the contaminants included in the air, which are not collected in the contaminant collecting receptacle 130 or separated by the contaminant blocking member 153, finally are separated from the air and re-join the descending cyclone stream.

The air cleaned as in the above-described processes is discharged outside through the paths 152 of the grill 150, the air discharge portion 117, and the air discharge path 220 and the motor driving chamber of the vacuum cleaner body 200.

As described above, the cyclone-type dust collecting apparatus of a vacuum cleaner according to the present invention has a dual contaminant separating structure in which contaminants included in a cyclone stream are primarily discharged and collected in the second contaminant collecting space D2 of the contaminant collecting receptacle 130 through the first contaminant discharge paths 113*a*, 113*b* formed on the first inner cylinder 113 of the cyclone body 110. A secondary discharge and collection of the contaminants is effected in the second contaminant collecting space D2 through the second contaminant discharge paths 133*a*, 133*b* formed on the second inner cylinder 133 of the contaminant collecting receptacle 130. In addition, since the second contaminant collecting space D2, in which the contaminants are collected, is isolated from the cyclone stream, contaminants can be separated and collected more effectively.

Moreover, a portion of the contaminants rising with the cyclonic air that have not been separated in the above-described process is blocked by the contaminant blocking member 153 and these contaminants return to the cyclone stream, thereby being prevented from approaching near the paths 152 of the grill 150 and the contaminant reverse flow action can be minimized.

According to the present invention as described above, the efficiency of a dust collecting action can be significantly improved not only as the contaminants are effectively separated and collected but also as the reverse flow of the contaminants is inhibited. Therefore, a vacuum cleaner remarkably satisfying in the user's perspective can be provided and the competitiveness of the product can be highly increased.

The foregoing embodiments and advantages are merely exemplary and are not to be construed as limiting the present invention. The present teaching can be readily applied to other types of apparatus. The description of the present invention is intended to be illustrative, and not to limit the scope of the claims. Many alternatives, modifications, and variations will become apparent to those skilled in the art after an understanding of the invention has been achieved. In the claims, means-plus-function clauses are intended to cover the structures described herein as performing the recited function and not only structural equivalents but also equivalent structures.

What is claimed is:

1. A cyclone-type dust collecting apparatus for a vacuum cleaner comprising:

a cyclone body having a body portion with a dual structure, including a first outer cylinder and a first inner cylinder being open at a lower side thereof, and an air inlet portion and an air discharge portion connected to an upper surface of the body portion in an area of an upper surface of the inner cylinder for air, including entrained contaminants, flowing into the cyclone body through the air inlet portion to form a cyclone stream, the cyclone body having at least one first contaminant discharge path formed on the lower side of the first inner cylinder for discharging contaminants separated by the centrifugal force of the cyclone stream to a space between the first inner cylinder and the first outer cylinder;

a contaminant collecting receptacle, removably mounted to the cyclone body, for collecting contaminants separated from the air by the cyclone stream generated inside the cyclone body, the contaminant collecting receptacle further having an inner space divided into a first contaminant collecting space and a second contaminant collecting space by a dual structure, including a second outer cylinder corresponding to the first outer cylinder and a second inner cylinder corresponding to the first inner cylinder, the contaminant collecting receptacle having at least one second contaminant discharge path formed on the lower side of the second inner cylinder for discharging contaminants from the first contaminant space to the second contaminant space; and a grill mounted at the beginning of the air discharge portion inside the cyclone body for preventing the contaminants separated from the air from flowing in a reverse direction through the air discharge portion.

2. The cyclone-type dust collecting apparatus for a vacuum cleaner according to claim 1 further comprising a pair of first contaminant discharge paths and a pair of second contaminant discharge paths, with each member of the pair formed to face the other member of the pair.

3. The cyclone-type dust collecting apparatus for a vacuum cleaner according to claim 1, wherein the grill comprises:

a grill body; and a plurality of paths formed on an outer circumferential surface of the grill body to provide fluid communication to the air discharge portion.

4. The cyclone-type dust collecting apparatus for a vacuum cleaner according to claim 3, wherein the paths are formed by a plurality of path members disposed on the outer circumferential surface of the grill body at predetermined intervals to slant at a predetermined angle.

5. The cyclone-type dust collecting apparatus for a vacuum cleaner according to claim 1, wherein the grill comprises:

a grill body;

a plurality of paths formed on an outer circumferential surface of the grill body to provide fluid communication to the air discharge portion; and a contaminant blocking member disposed below the grill body for inhibiting contaminants from rising with the air in the contaminant collecting receptacle and becoming rejoined with the cyclone stream.

6. The cyclone-type dust collecting apparatus for a vacuum cleaner according to claim 5, wherein the paths are formed by a plurality of path members disposed on the outer circumferential surface of the grill body at predetermined intervals to slant at a predetermined angle.

7. The cyclone-type dust collecting apparatus for a vacuum cleaner according to claim 5, wherein the contaminant blocking member comprises a frusto-conical portion extended downwardly at a predetermined angle from the lower circumferential end of the grill body, and a cylindrical portion extended downwardly for a predetermined length from the frusto-conical portion.

8. The cyclone-type dust collecting apparatus for a vacuum cleaner according to claim 7, wherein the contaminant blocking member is integrally formed with the grill body.

9. The cyclone-type dust collecting apparatus for a vacuum cleaner according to claim 7, wherein the contaminant blocking member formed separately from the grill body is assembled with the grill body by a connection means.

10. The cyclone-type dust collecting apparatus for a vacuum cleaner according to claim 9, wherein the connection means comprises a fastening protrusion and a fastening groove formed on connection portions of the contaminant blocking member and on the grill body respectively, so as to correspond with each other, wherein the fastening protrusion and the fastening groove have both long and short axes and are fastened to each other by inserting the fastening protrusion into the fastening groove with the long axes being coincident and then turning the fastening protrusion so that the long axis of the fastening protrusion engages the short axis of the fastening groove.

* * * * *